Feb. 1, 1955

C. J. BAUMGARD 2,701,176

CABLE SYSTEM FOR RECORDERS

Filed Feb. 9, 1954

INVENTOR.
CHARLES J. BAUMGARD
BY

ATTORNEY

Feb. 1, 1955  C. J. BAUMGARD  2,701,176
CABLE SYSTEM FOR RECORDERS
Filed Feb. 9, 1954  2 Sheets-Sheet 2

*INVENTOR.*
CHARLES J. BAUMGARD
BY
ATTORNEY

United States Patent Office 2,701,176
Patented Feb. 1, 1955

2,701,176

CABLE SYSTEM FOR RECORDERS

Charles J. Baumgard, Tarzana, Calif., assignor to Librascope, Incorporated, Glendale, Calif., a corporation of California Application February 9, 1954, Serial No. 409,219

2 Claims. (Cl. 346—29)

The present invention relates to a recording mechanism, and more particularly to improvements in a co-ordinate point plotter of the character disclosed in the application for United States patent of Donald C. Webster, Serial No. 213,607 filed March 2, 1951, for Recording Mechanism, now Patent No. 2,675,291, issued April 13, 1954.

The invention therein disclosed is embodied in a recorder consisting essentially of the combination of a chart, a stylus assembly arranged to allow the stylus or plotting element to move in two mutually perpendicular directions and thus make all points on the chart accessible to the stylus, and a stylus drive mechanism. The stylus drive mechanism comprises a pulley supported cable connected with the stylus and having a driving connection with each of two driver pulleys or drums. A differential is arranged in driving relation with each of the driver drums, and abscissa and ordinate value input means are provided for the differentials. Each of said input means is operable through the differential, pulley and cable system to effect a movement of the stylus with respect to the chart in a direction normal to the direction of movement of the stylus effected by the other input means. The plotter mechanism of the invention also includes means whereby the chart may be maintained in curve inscribing contact with the stylus or brought out of contact with the stylus when point plotting as distinguished from curve inscribing is desired.

In the structural embodiment of the recorder of the aforesaid application, the stylus was mounted on a carriage or traveller slidably mounted on supporting guide tubes at its opposite ends. A cable reeved over pulleys carried by the carriage and disposed in planes parallel to the plane of the chart plate adjacent the four corners of the carriage and thence over pulleys carried by the supporting member was used for the dual purpose of causing movement of the stylus longitudinally of the carriage and movement of the carriage transversely of the chart plate. Under such circumstances, it was found that carriage traversing forces exerted by the cable at the lower end of the carriage would cause the carriage to bind on its supporting guide tubes on which it was mounted with adjustable clearance, thus interfering with the proper operation of the device.

The primary object of the present invention is to eliminate such binding of the carriage on its supporting guide tubes.

This object is accomplished according to the present invention essentially by the use of additional pulleys and a rearrangement of the carriage mounted pulleys and of the cable reeving in such a way that all forces imposed by the cable for the purpose of traversing the carriage across the chart plate are imposed upon the upper end of the carriage adjacent the suspension thereof; while at the same time providing for movement of the stylus longitudinally of the carriage.

In summary, this is accomplished by disposing a single carriage traversing pulley with its axis in a plane at a right angle to the plane of the chart plate adjacent one end of the carriage and disposing the remaining carriage traversing pulleys in planes parallel to the plane of the chart plate adjacent the opposite end of the carriage. The cable is then reeved over these pulleys and over the idler pulleys and driving drums carried by the support member in essentially the same manner previously used, so that movement of the driver drums in the same direction will traverse the carriage across the chart plate, while movement of the driver drums in opposite directions will traverse the stylus longitudinally of the carriage.

The manner in which the foregoing, together with additional objects and advantages of the invention, are accomplished, will be apparent from the following description taken in conjunction with the drawings forming part of this specification, in which.

Figure 2:
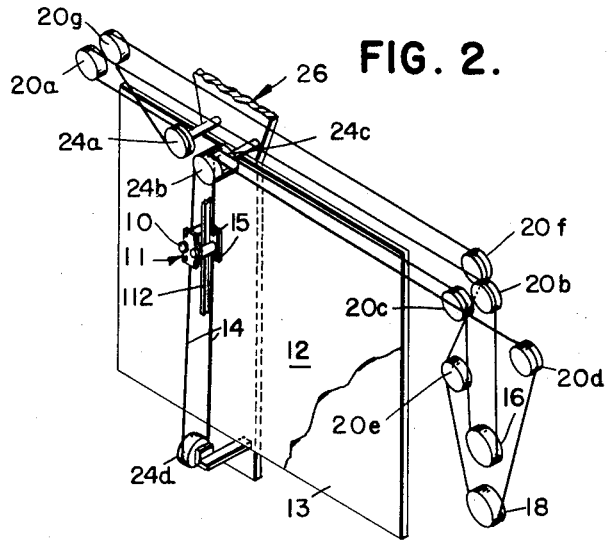
Figure 2 is a schematic illustration in perspective of the chart plate, carriage, pulleys, and cable reaving embodying the present invention.

Referring to Figure 2 which schematically illustrates the mechanism of the present invention, 10 is a stylus mounted in a stylus carrier 11, located over a stationary chart or recording sheet 12, supported by a chart backing plate 13. Means are provided to cause the stylus to move either vertically or horizontally with respect to the chart or in a direction which is the resultant of simultaneously induced vertical and horizontal movement to inscribe or plot on the chart an appropriate graph or series of points. The control means for the stylus 10 comprises a cable 14 to which the stylus carrier is secured at 15; driver drums 16 and 18 around which the cable 14 is wound to prevent slippage upon the drums on rotation of the latter; a number of fixedly positioned idler drums 20a to 20g, inclusive, which are mounted on the supporting frame of the instrument, and a plurality of rotatable pulleys 24a to 24d, inclusive, mounted on a carriage 26 disposed for movement longitudinally of the chart 12 and chart plate 13 in a manner hereinafter described.

When the driver drum 16 is rotated counter-clockwise, as indicated by the arrow thereon in Figure 2, a tension is applied to the run of the cable leading to driver drum 16 over idler drum 20c from carriage traverse pulley 24c, applying a force at the axis of pulley 24c, tending to move the carriage 26 rightwardly across the chart plate 12, as viewed in Figure 2. From carriage traverse pulley 24c, the cable passes to its point of connection 15 with the stylus carriage 11, and from that point over the pulley 24d which, it will be observed, is mounted with its axis in a plane parallel to the plane of the chart 12 and chart plate 13, so that no force exerted by the cable at the axis of the pulley 24d tends to move the carriage 26 transversely with respect to the chart plate 13. From the pulley 24d the cable passes over carriage traverse pulley 24b, exerting a force at the axis of pulley 24b, tending to move the carriage 26 rightwardly with respect to the chart 12, passing thence over idler 20d and over driver drum 18 which, as indicated by the arrows thereon, is rotating clockwise in the carriage traversing operation. Thence the cable passes over idlers 20e, 20f, and 20g to carriage traverse pulley 24a at which exactly the right amount of cable is paid out to permit the rightward movement of carriage 26 caused by the carriage traversing forces exerted at the axes of pulleys 24b and 24c, as previously described. Thence the cable passes over idler drums 20a and 20b back to the driver drum 16. It will be evident that in this operation no movement of the stylus 10 longitudinally of the carriage 26 is caused because the rightward movement of the carriage 26 across chart plate 13 exactly compensates for the movement of the cable at point 15 where the cable is connected to the stylus carrier 11.

Conversely, when the driver drums 16 and 18 are rotated in the same direction, movement of the stylus 10 longitudinally of the carriage 26 (transversely of chart 12) is caused without movement of the carriage 26 longitudinally of the chart 12, as described in detail in the aforesaid Webster application.

Figure 1:
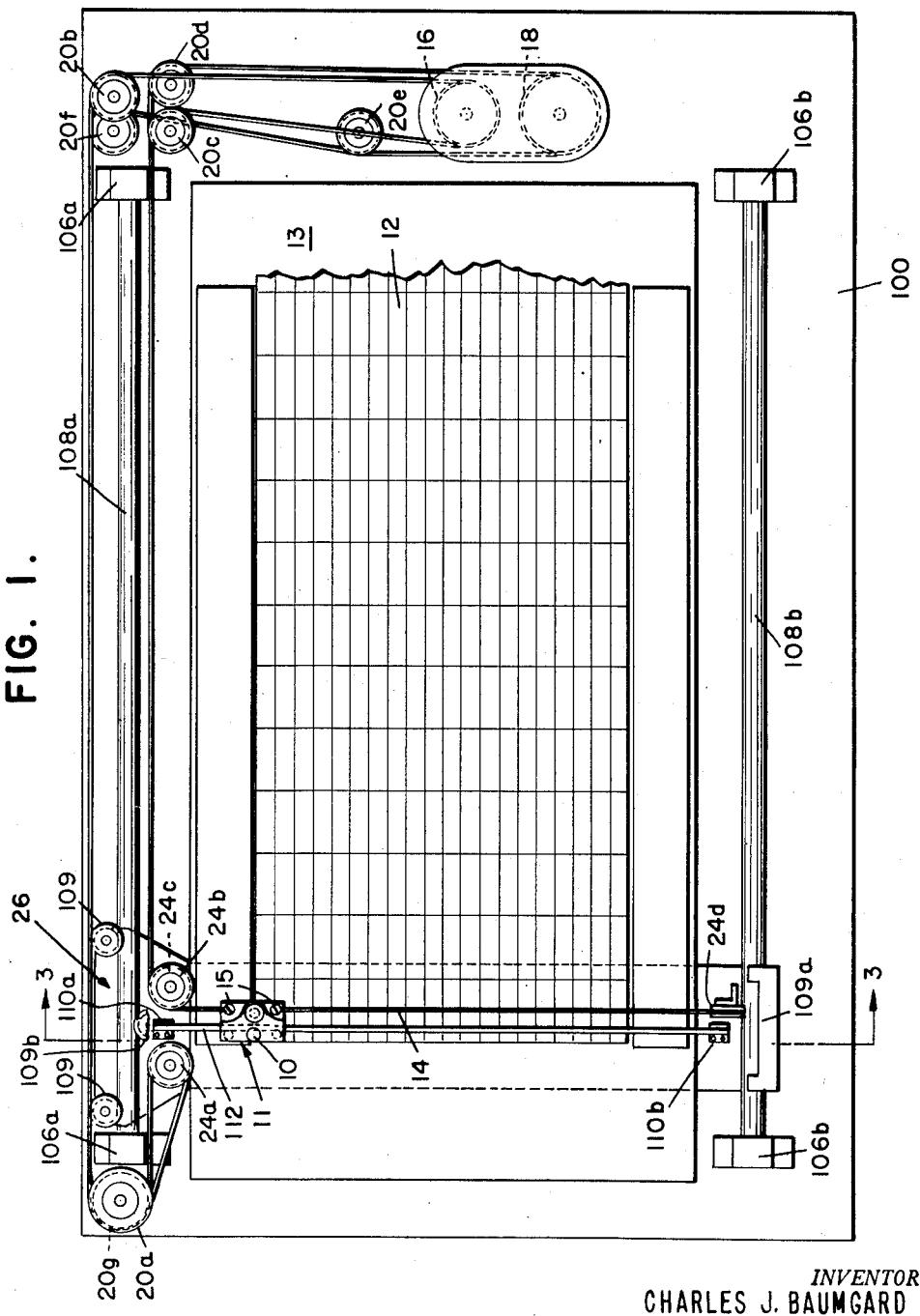
Figure 1 is a view in front elevation of a structural embodiment of a recorder embodying the present invention.
Figure 3:
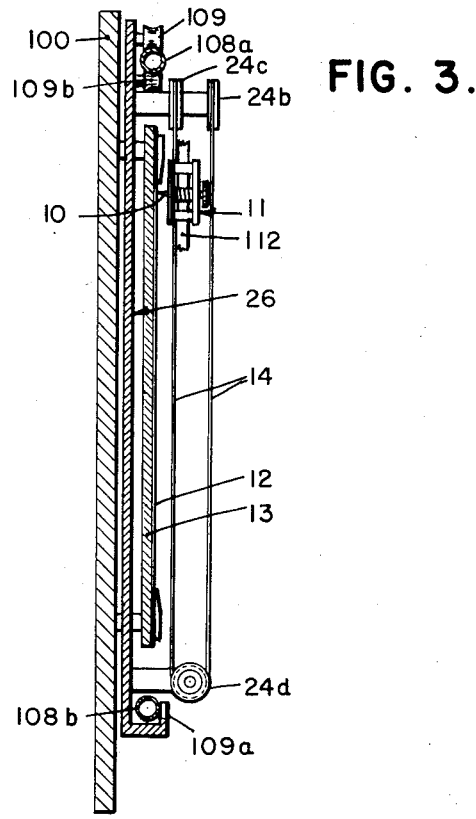
Figure 3 is a sectional view of the mechanism of Figure 1 taken on the line 3—3 of Figure 1.

The structural arrangement of the parts shown schematically in Figure 2 is illustrated in Figures 1 and 3, in which the principal supporting member for the assembled elements is illustrated as a main plate 100 having secured thereto brackets 106a and 106b, supporting guide tubes 108a and 108b respectively. In Fig. 1, the stylus carriage 26 is shown in position for zero range and zero depth. The carriage 26 is provided at its upper end with a pair of rollers 109 and an opposed roller 109b, by which it is supported on the upper guide tube 108a; at its lower end, carriage 26 extends between the plate 100 and the lower guide tube 108b, which is disposed in spaced relation to the plate 100 by its mounting brackets 106b. Preferably the lower end of carriage 26 is provided with a flange 109a loosely embracing the lower guide tube 108b for the purpose of preventing the carriage 26 from rocking into frictional engagement with the plate 100.

The carriage 26 is provided with upper and lower end brackets 110a and 110b, respectively, supporting in spaced relation to the body of the carriage a non-circular rod 112 on which the stylus carriage 11 is slidably mounted. Also mounted on the carriage adjacent its upper end are pulleys 24a b and c, the latter two being coaxial. Adjacent the lower end of the carriage 26 is mounted the pulley 24d. This pulley, as previously noted, is disposed for rotation about an axis perpendicular to the axes of pulleys 24a, 24b and 24c, and parallel to the plane of the chart plate 12. Thus when tension is applied to the cable 12, the forces acting do not tend to pull the stylus carriage 26 out of its position for allowing movement of the stylus carriage in proper alinement with the axes of chart 12. The cable 14 is attached to the stylus assembly 10 at 15, being reeved through the various pulleys, as previously described, to the driver drums with which it has sufficient frictional engagement so that the driver drums may drive the cable without slippage. This is preferably accomplished by passing the cable a plurality of times around each driver drum, the drums being helically grooved for the purpose.

The operation of the assembly is in all respects as described in the aforesaid Webster application, to which reference is made for a full disclosure of details of construction and operation not specifically included herein.

What is claimed is:

1. A recorder comprising a support member, a chart plate mounted thereon, a pair of parallel guide members mounted on said support member, a carriage mounted for movement across said plate in guided relationship with said guide members, a stylus member slidably mounted on said carriage for movement at a right angle to the direction of movement of said carriage and adapted to overlie all points within the margins of the chart area of said plate, and means for moving said stylus member to any point within the confines of the chart area of said plate, comprising a pair of driver drums rotatably mounted on said support member, a pair of idler drums rotatably mounted on said support member, a series of pulleys carried by said carriage; at least two of said series being carriage traverse pulleys disposed in a plane parallel to that of said chart plate and having their axes intersecting a line parallel to the direction of movement of said carriage, and a third of said series being a stylus traverse pulley disposed in a plane at a right angle to that of said chart plate, and a cable having portions extending between said two pulleys said third pulley in a direction lengthwise of said carriage and portions extending in a direction parallel to the direction of travel of said carriage; said cable being reeved from one of said carriage traverse pulleys to one of said driver drums, from said one driver drum to one of said idler drums, from said one idler drum to another of said carriage traverse pulleys, from said other of said carriage traverse pulleys to the second of said pair of idler drums, from the second of said pair of idler drums to the second of said pair of driver drums, from the second of said pair of driver drums to said third one of said series of pulleys carried by said carriage and from the said third one of said series of pulleys to said one of said carriage traverse pulleys; a fixed connection betwen a portion of said cable extending lengthwise of said carriage and said stylus member, means for connecting said cable to said driver drums to provide a positive two-way driving connection between said drums and said cable, and actuating means connected to said driver drums.

2. In a recorder, a support member, a chart plate mounted thereon, a chart disposed on said chart plate, a pair of parallel guide members mounted on said support members, a carriage mounted for movement across said plate in guided relationship with said guide members, a stylus member rotatably mounted on said carriage for movement in a direction normal to the direction of movement of said carriage and adapted to overlie all points within the margins of said chart, means for moving said tylus member to any point within the margins of said chart, comprising a pair of driver drums rotatably mounted on said support member, a pair of idler drums rotatably mounted on said support member, a series of pulleys rotatably disposed on said carriage, at least two of said series being carriage traverse pulleys disposed about axes normal to the plane of said chart plate and lying in a plane parallel to the direction of movement of said carriage, a third of said series being a stylus traverse pulley disposed about an axis parallel to the plane of said chart; and a cable having portions extending between said two pulleys and said third pulley in a direction lengthwise of said carriage and portions extending parallel to the direction of travel of said carriage; said cable being reeved from one of said carriage traverse pulleys to one of said driver drums, from said one idler drum to another of said carriage traverse pulleys, from said other of said carriage traverse pulleys to the second of said pair of idler drums, from the second of said pair of idler drums to the second of the said pair of driver drums, from the second of said pair of driver drums to said third one of said series of pulleys carried by said carriage, and from said third one of said series of pulleys to said one of said carriage traverse pulleys; a fixed connection between a portion of said cable extending lengthwise of said carriage and said stylus member; means for connecting said cable to said driver drums to provide a positive two-way driving connection between said drums and said cable, and actuating means connected to said driver drums.

No references cited.